United States Patent
Ibrahim et al.

(10) Patent No.: US 12,189,381 B2
(45) Date of Patent: Jan. 7, 2025

(54) EXTENDED REALITY PLAYBACK OF EVENTS FOR MANUFACTURING, INSTALLATION, OPERATION, MAINTENANCE AND REPAIR OF INFRASTRUCTURE EQUIPMENT

(71) Applicant: ASCO Power Technologies, L.P., Florham Park, NJ (US)

(72) Inventors: Mario Ibrahim, Summit, NJ (US); Tewfik Meftah, Grenoble (FR); Olivier Bouffet, Mountain Lakes, NJ (US)

(73) Assignee: ASCO Power Technologies, L.P., Florham Park, NJ (US)

( * ) Notice: Subject to any disclaimer, the term of this patent is extended or adjusted under 35 U.S.C. 154(b) by 692 days.

(21) Appl. No.: 17/458,209

(22) Filed: Aug. 26, 2021

(65) Prior Publication Data
US 2021/0389758 A1    Dec. 16, 2021

Related U.S. Application Data

(63) Continuation-in-part of application No. 16/878,166, filed on May 19, 2020, which is a continuation of
(Continued)

(51) Int. Cl.
*G05B 23/02* (2006.01)
*G05B 15/02* (2006.01)

(52) U.S. Cl.
CPC ......... *G05B 23/0272* (2013.01); *G05B 15/02* (2013.01); *G05B 23/0216* (2013.01);
(Continued)

(58) Field of Classification Search
None
See application file for complete search history.

(56) References Cited

U.S. PATENT DOCUMENTS 9,256,072 B2 * 2/2016 Lyren ...................... G06F 3/012
9,891,910 B1 * 2/2018 Cumming ............. H04L 67/025
(Continued)

OTHER PUBLICATIONS

EP Extended Search Report for European Patent Application No. 21203514.1 dated Mar. 10, 2022.

*Primary Examiner* — Roy Y Yi
(74) *Attorney, Agent, or Firm* — Locke Lord LLP

(57) ABSTRACT

System and methods for monitoring and control infrastructure equipment uses extended reality playback to monitor such infrastructure equipment. The system and method advantageously blends videos and images of physical equipment with computer-generated representations of events to enable playback of the events, including any user interactions with the equipment. The extended reality playback presents events captured by real-time event logs for the infrastructure equipment using extended reality media content. The playback is composed of a real-time sequence of media content depicting one or more equipment operations corresponding to the events as a continuous presentation. The real-time sequence can then be displayed in real time and stored for subsequent playback at any time by a user. The real-time sequence can also be compared to a verified "golden" sequence to detect errors in the infrastructure equipment.

20 Claims, 8 Drawing Sheets

Related U.S. Application Data application No. 14/206,505, filed on Mar. 12, 2014, now Pat. No. 10,712,735.

(60) Provisional application No. 63/107,793, filed on Oct. 30, 2020, provisional application No. 61/776,805, filed on Mar. 12, 2013.

(52) U.S. Cl.
CPC ............. *G05B 2219/24055* (2013.01); *G05B 2219/2642* (2013.01); *Y04S 10/52* (2013.01)

(56) References Cited

U.S. PATENT DOCUMENTS

| | | | |
|---|---|---|---|
| 11,030,814 B1* | 6/2021 | Kwiatkowski | G06T 19/006 |
| 2012/0249588 A1* | 10/2012 | Tison | G06V 20/20 |
| | | | 382/103 |
| 2014/0006762 A1* | 1/2014 | Bittner | G06F 11/3003 |
| | | | 713/1 |
| 2018/0365495 A1 | 12/2018 | Laycock et al. | |
| 2020/0026257 A1 | 1/2020 | Dalal et al. | |
| 2020/0034621 A1 | 1/2020 | Doba | |
| 2020/0336707 A1 | 10/2020 | Schmirler et al. | |

* cited by examiner

EXTENDED REALITY PLAYBACK OF EVENTS FOR MANUFACTURING, INSTALLATION, OPERATION, MAINTENANCE AND REPAIR OF INFRASTRUCTURE EQUIPMENT

CROSS-REFERENCE TO RELATED APPLICATION

The present U.S. patent application claims priority to U.S. Provisional Application No. 63/107,793 filed Oct. 30, 2020, and is a continuation-in-part of co-pending U.S. patent application Ser. No. 16/878,166, filed May 19, 2020, which is a continuation of U.S. patent application Ser. No. 14/206,505, filed Mar. 12, 2014, which issued as U.S. Pat. No. 10,712,735 on Jul. 14, 2020, and which claims priority to U.S. Provisional Application No. 61/776,805, filed Mar. 12, 2013, all of which are herein expressly incorporated by reference.

TECHNICAL FIELD

Embodiments of the present disclosure relate to display and playback of events associated with infrastructure equipment from user-selected viewpoints for use in extended reality assisted manufacturing, installation, operation, maintenance and repair of such infrastructure equipment.

BACKGROUND

Various infrastructure real-time monitoring systems exist on the market today. These infrastructure monitoring systems provide real-time visual statuses of equipment in an infrastructure system. For instance, a system-wide event log may be stored in list and data graph format. This system-wide event log may include time-stamped analog trends and critical alarms that occurred throughout the infrastructure system. Further, this system-wide event log may be used for future analysis of equipment faults, failures or sequence of events.

System users may use the stored event logs to identify root causes of failures in the equipment of the infrastructure system. For example, the event logs may include faults, alerts, or messages from any equipment, equipment issues such as equipment faults, failures, or outages, extreme temperature changes in the equipment, and the like. In some systems, an infrastructure analyzer may be implemented to aggregate the event logs and compare the events to a specification of a model of the equipment in order to determine if that model is falling below a certain level. Yet there is no solution that visually simulates or displays the events on the actual equipment as the events have occurred in the past.

Although components and methods tracking equipment faults, failures or sequence of events have generally been considered satisfactory for their intended purpose, there is still a need in the art for improved tracking, sequencing, and troubleshooting abilities. The present disclosure provides a solution for this need.

SUMMARY OF THE INVENTION

Embodiments of the present disclosure relate to playback of events associated with physical infrastructure equipment. The embodiments employ an infrastructure monitoring and control system and method that can play back a series of events in real time and any time thereafter, as selected by a user. This infrastructure monitoring system and method advantageously blends videos and images of physical equipment with computer-generated representations of events to enable extended reality playback of the events, including any user interactions with the equipment. Such an extended reality monitoring and control system and method can receive real-time event data from event logs for the infrastructure equipment and access media content depicting one or more equipment operations corresponding to the events from a repository or library of such media content. The infrastructure monitoring and control system and method can thereafter combine the media content into a sequence that presents the series of events as a continuous presentation. The sequence can then be displayed in real time or played back at any time by a user, using a user-selected viewpoint. The type of media content may vary, from simple symbolic content, such as line and arrows, symbols and icons, to plain text, to more realistic 3-D animated models. In some embodiments, the infrastructure monitoring and control system and method can also automatically compare the real-time sequence to a known good or valid sequence involving the same events and equipment to quickly identify points of divergence.

The infrastructure equipment can be displayed as a simulation, or the infrastructure equipment can be displayed as a real-time video representation of real infrastructure equipment. The one or more equipment operations can be visual representations of events happening to the displayed infrastructure equipment. The displayed infrastructure equipment can be set in a virtual background. The system and method can facilitate manipulating the infrastructure equipment, including reversing at least one of the series of events.

The continuous presentation can be displayed on a plurality of displays, wherein each of the plurality of displays are located at different locations. The system and method can include displaying a characteristic of the equipment in a virtual layer over the equipment. The characteristics can include an internal temperature, or a presence of flammable gas within the equipment.

Sequencing can be stopped once the infrastructure has reached a steady state or no changes have taken place after a predetermined time period. The system and method can display a composite image showing playback with no events and the sequenced media in order to compare normal operation to an event operation.

The events can be precipitated by a first user and validated by a second user. Access to the system and method is granted by authorized user identification at a terminal.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
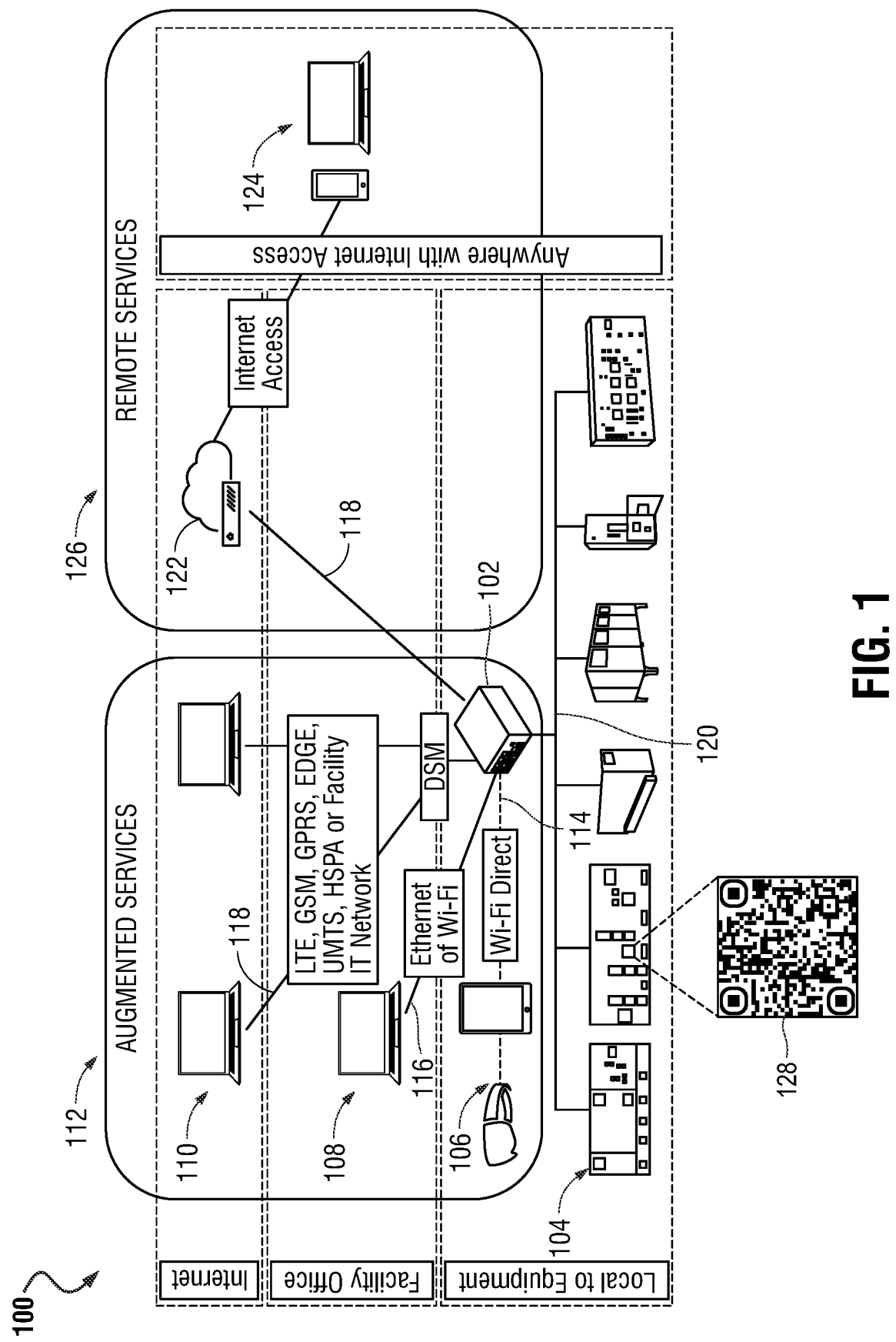
FIG. 1 illustrates an exemplary architecture for extended reality monitoring and control and playback according to embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that aspects of the present disclosure, as generally described herein, and illustrated in the figures, can be arranged, substituted, combined, separated, and designed in a wide variety of different configurations, all of which are explicitly contemplated herein.

FIG. 1 illustrates an exemplary architecture 100 in which embodiments of the extended reality monitoring and control system and method disclosed herein may be implemented. Although FIG. 1 shows a particular arrangement of elements and functions, it should be understood that numerous variations from the arrangement and functions shown are possible while remaining within the scope and spirit of the claims. For instance, elements may be added, removed, combined, distributed, substituted, re-positioned, re-ordered, or otherwise changed. Further, the functions carried out by embodiments of the present disclosure performed by or through application of hardware, firmware and/or software logic. These embodiments may include one or more processors programmed with instructions to implement the functions described.

Central to the exemplary architecture 100 is an infrastructure monitoring and control system 102 that can be used to monitor infrastructure equipment 104. The infrastructure equipment 104 may be any type of equipment commonly used to support operation of a facility, building, manufactory, plant, and the like. Power infrastructure equipment, for example, may include switching components (e.g., automatic transfer switches (ATS), control relays, etc.), distribution components (e.g., panel boards, busways, etc.), protection components (e.g., circuit breakers, fuses, etc.), secure power components (e.g., UPS, generator sets ("gensets"), etc.), and similar electrical power components known to those skilled in the art. Network infrastructure equipment, on the other hand, may include routers, firewalls, network switches, servers, load balancers, intrusion detection systems, domain name systems, data storage systems, and the like.

The infrastructure monitoring and control system 102 is operable to provide extended reality playback of events associated with the infrastructure equipment 104. The playback can facilitate or assist equipment personnel with assembling, installing, operating, maintaining, and repairing the infrastructure equipment 104, among other things. Specifically, the infrastructure monitoring and control system 102 combines videos and images of the actual (i.e., physical) infrastructure equipment 104 with computer-generated representations of events associated with the infrastructure equipment to generate extended reality media content. The term "extended reality" encompasses multiple types of media technologies, including, but not limited to, virtual reality media players (in which a user is entirely immersed within and can interact with computer-generated content), augmented reality media players (in which the user is presented with computer-generated content overlaid on real-world content), and mixed reality media players (in which the user interacts with and manipulates computer-generated content overlaid on real-world content).

The extended reality media content can be accessed and played back from user devices equipped with various types of media players connected to the infrastructure monitoring and control system 102. The user devices include devices 106 that are typically used locally (i.e., on-site) relative to infrastructure equipment 104, devices 108 that are typically used at an office facility, and devices 110 that are typically connected to the infrastructure monitoring and control system 102 over the Internet. These user devices allow a user to display in real time, and play back anytime, the extended reality media content provided by the infrastructure monitoring and control system 102. The infrastructure monitoring and control system 102 can thus provide extended reality real-time interactions, simulation creation, and playback services, referred to herein as augmented services 112.

Examples of user devices 106 that can be used locally to the infrastructure equipment 104 include mobile devices, handheld devices, and wearable devices, such as smartphones, tablets, and virtual and mixed reality glasses and headsets (e.g., Oculus VR Headsets, Microsoft HoloLens, etc.). Such user devices 106 are particularly useful when employing the extended reality playback disclosed herein to assist with configuring or commissioning the infrastructure equipment 104, as explained herein. Examples of user devices 108 that can be used at an office facility include workstations, personal computers, desktops, laptops, and the like. Such devices 108 are particularly useful when employing the extended reality playback herein to monitor the infrastructure equipment 104, for example, in a "Digital Twin" arrangement. And examples of devices 110 that connect remotely to the infrastructure monitoring and control system 102 over the Internet include any of the devices 106, 108 mentioned earlier. Such devices 110 are particularly useful when employing the extended reality playback to provide remote assistance or maintenance to on-site facility personnel.

Various types of network connections may be used to connect the user devices 106, 108, 110 to the infrastructure monitoring and control system 102. For example, a direct Wi-Fi connection 114 or other suitable connection may be used to connect the devices 106 to the infrastructure monitoring and control system 102. An Ethernet or Wi-Fi connection 116 may be used to connect the devices 108 to the infrastructure monitoring and control system 102. A cellular and/or satellite connection (e.g., LTE, GSM, GPRS, EDGE, UMTS, HSPA, 5G, etc.) 118 may be used to connect the devices 108 to the infrastructure monitoring and control system 102. Finally, an Ethernet connection 120 or other suitable network connection may be used to connect the infrastructure equipment 104 to the infrastructure monitoring and control system 102.

As for the infrastructure monitoring and control system itself, in some embodiments, this system 102 can take the form of an appliance hosted locally (i.e., on site at the facility) relative to the infrastructure equipment 104. In other embodiments, part of the infrastructure monitoring and control system 102 can be hosted in an appliance and part on a network, such as one or more cloud servers, indicated by cloud 120. In still other embodiments, the infrastructure monitoring and control system 102 can be hosted entirely on the cloud 120. The cloud 120 may be a private cloud (i.e., on-premise cloud), or it may be a cloud that is generally publicly available (e.g., Google Cloud Platform, Amazon Web Services, etc.). The cloud portion of the infrastructure monitoring and control system 102 may then be accessed from any user device with Internet access, generally indicated at 124. This allows offsite personnel with knowledge and expertise, among others things, to assist with operation, maintenance, and repair of the infrastructure equipment 104 using the extended reality playback from the infrastructure monitoring and control system 102, referred to herein as remote services 126.

In some embodiments, a visual code 128 may be provided on an exterior housing of one or more pieces of infrastructure equipment 104 for identification purposes. The visual code 128 may be a barcode, a quick response (QR) code, or similar types of code that, when scanned (e.g., by local user devices 106), allows the infrastructure monitoring and control system 102 to identify (e.g., from an equipment database) the type of infrastructure equipment and/or the facility where the equipment is installed. In some embodiments, instead of a visual code, the infrastructure component itself can be imaged (e.g., a picture) and image recognition can be used to identify the component. It is also possible to input a representative code to identify the component using 3-D positioning (e.g., Point Cloud), geolocation, and LIDAR. Once the infrastructure equipment is identified, the infrastructure monitoring and control system 102 can then access a media content repository or library, as discussed below, and retrieve media content for the identified infrastructure equipment.

In operation, the infrastructure monitoring and control system 102 receives real-time event data from real-time logs of events for the infrastructure equipment 104 and matches the events to media content corresponding to the events. The type of media content may vary based on the type of infrastructure equipment 104, as well as the particular events, including simple symbolic content, such as lines and arrows, icons and symbols, to plain text, to more realistic 3-D animation. The infrastructure monitoring and control system 102 then combines the media content into a continuous sequence that visually depicts the events as they were captured in the system event logs. The sequence can then be played back in real time or anytime by a user, from a user-selected viewpoint, via the user devices 106, 108, 110. In some embodiments, the infrastructure monitoring and control system 102 can also automatically validate the sequence against a confirmed good or so-called "golden" sequence involving the same events and equipment to quickly detect anomalies.

For purposes herein, the "events" that are recorded by system event logs include any operation or transition performed by or within the infrastructure equipment 104. Examples of such "events" include circuit breaker transitions from OPEN to CLOSE and CLOSE to OPEN, switch transitions from MAIN to BACKUP and BACKUP to MAIN, control relay transitions from ON to OFF and OFF to ON, among other types of transitions. These events are typically recorded in logs commonly generated in real time by controllers within the infrastructure equipment 104 and aggregated to provide a system-wide event log. The events typically occur in a particular sequence or pattern relative to one another according to the specific design and configuration of the infrastructure equipment 104. If the events fail to follow their designed sequence or pattern, then that could indicate an error or malfunction in the operation or maintenance of the equipment, prompting the infrastructure monitoring and control system 102 to issue an alert to equipment personnel.

Figure 2:
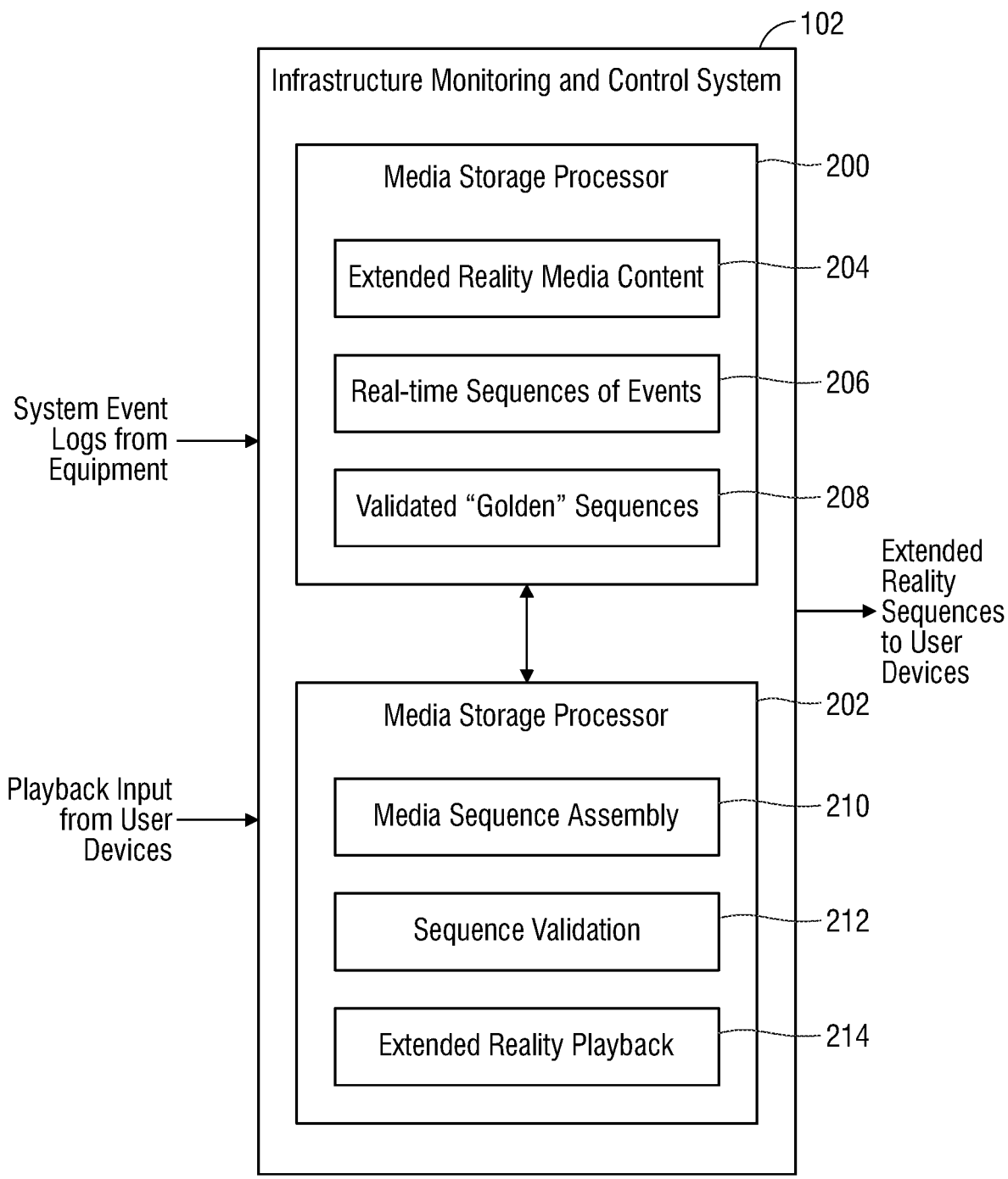
FIG. 2 illustrates an exemplary extended reality infrastructure monitoring and control system according to embodiments of the present disclosure.

FIG. 2 illustrates an exemplary implementation of the infrastructure monitoring and control system 102 from FIG. 1. In this example, the infrastructure monitoring and control system 102 is composed of several functional components, including a media storage processor 200 and a media playback processor 202, each functional component having a number of sub-components that are discussed in more detail further below. Each of the functional components 200 and 202 (and their sub-components) may be either a hardware based component (i.e., hosted on an appliance), a software based component (i.e., hosted on a network), or a combination of both hardware and software (i.e., hosted partly on an appliance and partly on a network). In addition, while the functional components 200 and 202 (and their sub-components) are shown as discrete blocks, any of these blocks may be divided into several constituent blocks, or two or more of these blocks may be combined into a single block, within the scope of the disclosed embodiments.

The media storage processor 200, in general, is responsible for the storage and retrieval of extended reality media content for the infrastructure monitoring and control system 102. To this end, the media storage processor 200 includes, or can access, a repository or library 204 that operates to store the extended reality media content. Such stored extended reality media content, in some embodiments, is composed of discrete, prerecorded or real-time video clips of the infrastructure equipment and computer-generated video segments that correspond to various types of events associated with various infrastructure equipment 104. These videos clips and segments may be organized by or within the library 204 using any suitable content indexing scheme known to those skilled in the art than can allow the media storage processor 200 to quickly locate and retrieve specific media content. New and updated media content may also be added to the library 204 from time to time as needed. Technical documentation, specifications, and operating manuals for the various types of infrastructure equipment 104 can also be stored in the library 204 for subsequent playback.

In addition to the extended reality media content library 204, the media storage processor 200 also includes, or can access, a repository or library 206 that operates to store real-time sequences of extended reality media content. These sequences of media content visually depict or simulate the series of events captured in the real-time system event logs for the infrastructure equipment 104. The sequences are composed by the media playback processor 202, as further discussed below, from the real-time system event logs and stored in the real-time sequences library 206. The media storage processor 200 can thereafter locate and retrieve specific sequences of media content, either automatically or as requested by a user, for subsequent playback on the user devices. This arrangement allows the sequences of extended reality media content to be viewed in real time initially as they are being composed, as well as played back at any time afterward.

The media storage processor 200 further includes, or can access, a repository or library 208 that operates to store confirmed good or verified "golden" sequence of media content for infrastructure equipment 104 being monitored. The media storage processor 200 can then retrieve specific "golden" sequences of media content as requested by the media playback processor 202 (discussed below) for sequence validation purposes. A simplistic example of a "golden" sequence of media content for a "Power Loss" sequence in certain types of electrical power infrastructure equipment is shown in Table 1. The infrastructure equipment 104 in this example is composed of two relays (RLY1, RLY2), two circuit breakers (CB1, CB2), and an automatic transfer switch (ATS1), and the verified sequence depicts the events that should occur for these components when AC main power is lost:

TABLE 1

Exemplary "Golden" Sequence

| Infrastructure Equipment Components | Verified Sequence |
|---|---|
| ATS1 | Main to Backup |
| CB1 | Close to Open |
| CB2 | Open to Close |
| RLY1 | On to Off |
| RLY2 | Off to On |

According to the "golden" sequence shown in Table 1, when AC main power is lost, the transfer switch (ATS1) should switch from Main to Backup power, the first circuit breaker (CB1) should transition from Close to Open, the second circuit breaker (CB2) should transition from Open to Close, the first control relay (RLY1) should transition from On to Off, and the second control relay (RLY2) should transition from Off to On. Any deviation from this sequence when loss of AC main power occurs could indicate an error or malfunction in the infrastructure equipment 104.

As for the media playback processor 202, this functional component is responsible for receiving real-time system event logs for the infrastructure equipment 104 and providing extended reality playback of the events in the event logs in real time. The extended reality playback provided by the media playback processor 202 is based on, and can be controlled by, input from user devices, such as the devices 106, 108, 110 discussed earlier. To accomplish the playback, the media playback processor 202 includes, or can access, a media sequence assembly component 210 that operates to assemble extended reality media content corresponding to the events in the system event logs.

In some embodiments, the media sequence assembly component 210 combines the extended reality media content by first requesting the content from the media storage processor 200 corresponding to the events in the system event logs. The media storage processor 200, upon receiving the request (via the media playback processor 202), locates and retrieves the requested content from the appropriate libraries 204, 206, and provides the content to the sequence assembly component 210 (via the media playback processor 202). The media sequence assembly component 210 then assembles (e.g., appends, concatenates, overlays, superimposes, etc.) the media content into a continuous presentation of media content. In some embodiments, the sequence assembly can be done chronologically according to time stamps or time tags associated with each event in the log. In this way, the sequence of media content assembled by the media sequence assembly component 210 tracks the series of events as captured in the system event logs.

Once the media sequence assembly component 210 has assembled the media content into a sequence, the media playback processor 202 can output the sequence as an extended reality version of the events in the system event logs. The media playback processor 202 can also send the sequences to the real-time sequences library 206 (via the media storage processor 200) for subsequent retrieval and playback. The playback can be played automatically in real time as the events occur and are captured in the system event logs, or at any time afterward as requested by equipment personnel via the user devices. To facilitate the playback, the media playback processor 202 includes, or can access, an extended reality playback component 214 that operates to output the extended reality media content to the user devices. For each user device, the extended reality playback component 214 implements and outputs the extended reality media content according to the media content handling protocol (e.g., Virtual Reality Transfer Protocol (VRTP)) used by that device and the media player therein. The extended reality media content is output based on, or as controlled by, input from the user devices.

In addition to providing extended reality media playback, the media playback processor 202 also performs validation of the events that form the basis of the extended reality media playback. Validation involves the media playback processor 202 requesting and receiving a verified or "golden" sequence from the media storage processor 200. This "golden" sequence allows the media playback processor 202 to compare the sequence of events assembled by the media sequence assembly component 210 to the verified or "golden" sequence stored via the media storage processor 200. To perform the comparison, the media playback processor 202 includes, or can access, a sequence validation component 212 that operates to check and compare the events in the sequence assembled by the media sequence assembly component 210 to the events in the corresponding "golden" sequence. The sequence validation component 212 thus provides a type of built-in-self-test (BIST) analysis that can help ensure proper configuration and operation of the infrastructure equipment 104 and predict potential equipment failures. The sequence validation component 212 can run the built-in-self-test analysis in real time upon receipt of a new or updated system event log to provide nearly continuous monitoring and control of the infrastructure equipment 104. A simplistic example of the built-in-self-test analysis performed by the sequence validation component 212 for the infrastructure equipment 104 can be seen in Table 2 below.

TABLE 2

Exemplary Analysis of Real-Time Sequence

| Infrastructure Equipment Components | Verified Sequence | Real-time Sequence |
|---|---|---|
| ATS1 | Main to Backup | Main to Backup |
| CB1 | Close to Open | Close to Open |
| CB2 | Open to Close | Open to Close |
| RLY1 | On to Off | On to Off |
| RLY2 | Off to On | (no media content) |

As the last row of Table 2 shows, the event in the real-time sequence assembled by the media sequence assembly component 210 for the second control relay (RLY2) is different from that shown in the verified or "golden" sequence. Specifically, for this exemplary real-time sequence, the second control relay (RLY2) was supposed to transition from Off to On, as specified by the "golden" sequence. However, the system event log recorded no event for the second control relay (RLY2) at that point in time, so no corresponding media content is shown in Table 2. This discrepancy indicates that there is likely an error or malfunction in the operation of the infrastructure equipment 104. The sequence validation component 212, upon detecting such an error or malfunction, notifies the media playback processor 202 accordingly.

When thus notified that an error or malfunction in the operation of the infrastructure equipment 104 has been detected, the media playback processor 202 takes appropriate steps to alert equipment personnel. In some embodiments, this can be done through the extended reality playback provided by the extended reality playback component 214. Recall from above that the extended reality playback component 214 operates to play back extended reality media content based on, or as controlled by, input from the user devices (e.g., devices 106, 108, 110). Thus, for example, the equipment personnel can choose, via the user devices, which sequence for the infrastructure equipment 104 to play back, and the extended reality playback component 214 outputs the selected extended reality media content to the user devices. Within that playback, the extended reality playback component 214 can also overlay or superimpose an indication that an error or malfunction in the operation of the infrastructure equipment 104 has been detected.

In some embodiments, the extended reality playback component 214 may provide the indication of an error or malfunction by overlaying real-world videos or images of the infrastructure equipment 104 with a computer-generated representation that highlights the error or malfunction. For example, instead of a green color computer-generated representation, an identical red color computer-generated representation may be used instead for the overlay, or some other attention-grabbing color. In other embodiments, the extended reality playback component 214 may overlay the real-world videos or images with symbols or texts that indicate the error or malfunction. Other ways known to those skilled in the art for indicating an error or malfunction by overlaying real-world videos or images with computer-generated representations are also within the scope of the present disclosure.

It can be surmised from the above that embodiments of the infrastructure monitoring and control system 102 offers many advantages and benefits. As discussed, the extended reality playback provided by the infrastructure monitoring and control system 102 simulates events occurring at the infrastructure equipment 104. The playback presents equipment personnel with a continuous presentation of extended reality media content that can be displayed at a user device, including any device equipped with an extended reality media player and user interface. The continuous presentation simulates an extended reality playback of a sequence of events occurring at the infrastructure equipment 104. The user devices may include Apple Watches, iPhones and iPads, Android-based phones and tablets, Microsoft Surface and Surface Duo tablets, as well as the virtual and mix reality devices discussed above with respect to FIG. 1.

Following now in FIGS. 3-9 are examples of the infrastructure monitoring and control system described herein being used to provide real-time extended reality event viewing and control of the infrastructure equipment 104 and extended reality playback of events associated with the infrastructure equipment 104.

Figure 3:
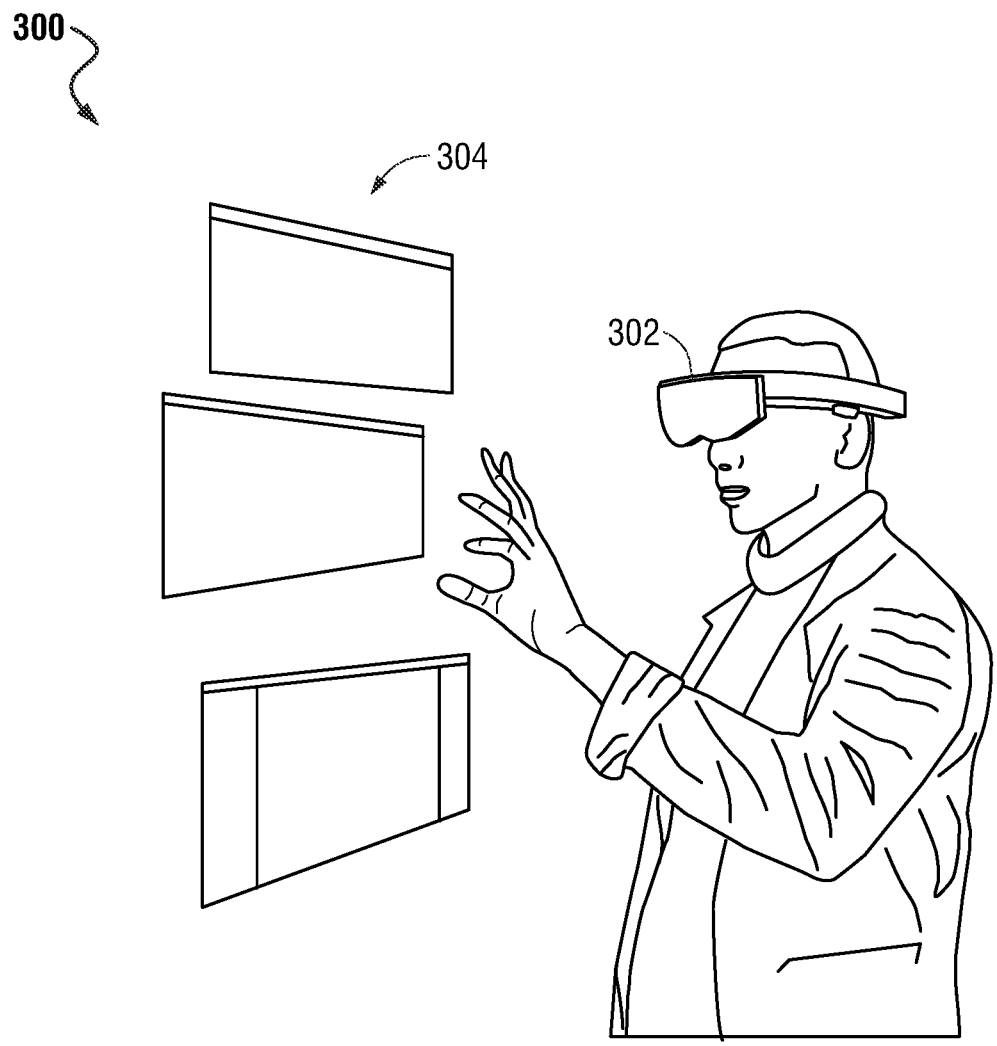
FIG. 3 illustrates an exemplary extended reality infrastructure monitoring and control scenario according to embodiments of the present disclosure.

FIG. 3 depicts an example of the infrastructure monitoring and control system being used in a virtual reality scenario 300 in some embodiments. In this scenario 300, the infrastructure monitoring and control system provides equipment personnel with extended reality playback that is fully immersive, such that the equipment personnel feels as close as possible to "being there." The equipment personnel typically wears a virtual reality headset 302 (e.g., Oculus VR Headsets, Microsoft HoloLens, etc.) that provides immersive, wide-angle stereo viewing, multidirectional sound, and includes onboard sensors that can measure orientation, accelerations, and/or position. The virtual reality headset 302 allows the equipment personnel to view the video and images of the infrastructure equipment 104 superimposed with computer-generated representations of events associated with the infrastructure equipment 104. Those having ordinary skill in the art will of course understand that instead of a virtual reality headset, other user devices discussed herein may also be used for the extended reality playback.

Figure 4:
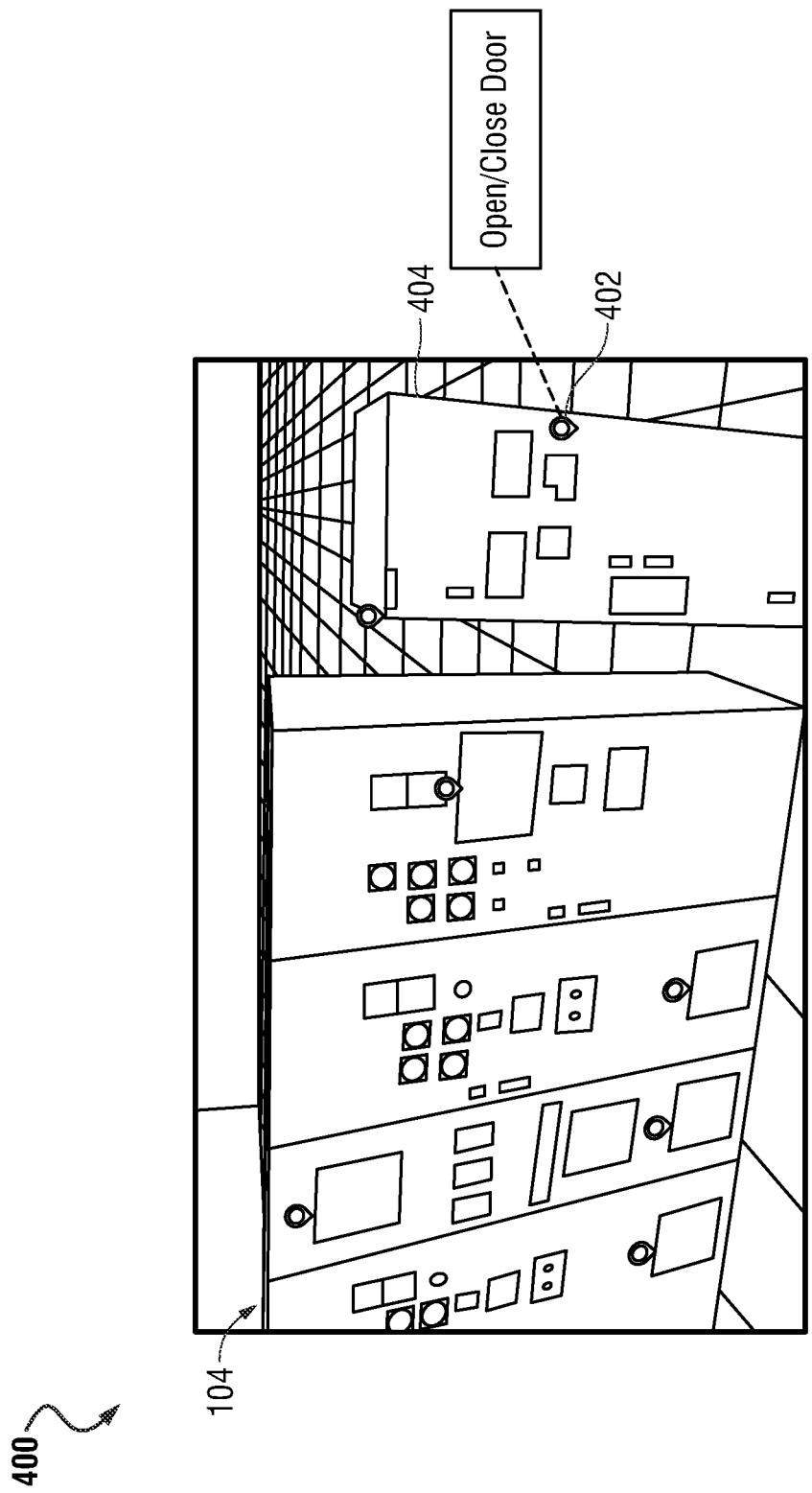
FIG. 4 illustrates an exemplary extended reality playback using the infrastructure monitoring system according to embodiments of the present disclosure.

FIG. 4 shows an example of an extended reality playback 400 of the infrastructure equipment 104 as viewed by the equipment personnel. As can be seen in this example, the playback 400 includes a video of the infrastructure equipment 104 and several computer-generated manipulation sites superimposed thereon, one of which is indicated at 402. The manipulation sites 402 represent points on the infrastructure equipment 104 that can be manipulated by the equipment personnel to effect some action or make available some option associated with the equipment. The equipment personnel can then hover over any one of the manipulation sites 402 to reveal the actions or options available at that manipulation site. For example, the manipulation site indicated at 402 is associated with a cabinet door 404 of one of the pieces of infrastructure equipment 104. Hovering over the manipulation site 402 reveals that the cabinet door 404 may be toggled opened or closed by touching or otherwise selecting the manipulation site 402 to reveal the interior.

Figure 5:
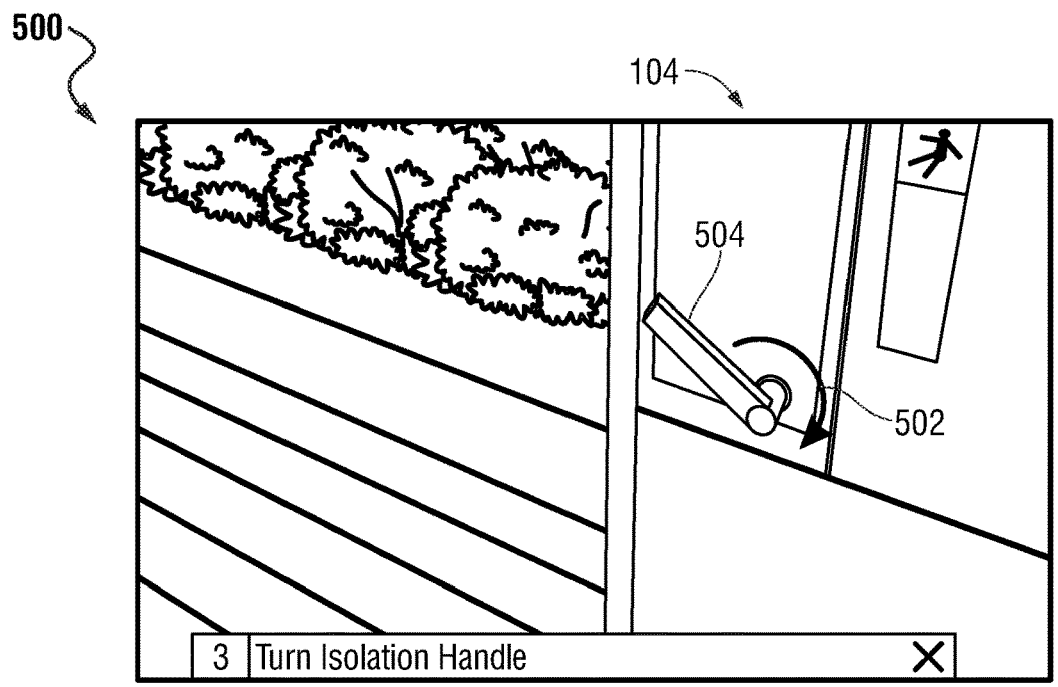
FIG. 5 illustrates an exemplary extended reality guided procedure playback using the infrastructure monitoring and control system according to embodiments of the present disclosure.

FIG. 5 shows an example of the infrastructure monitoring and control system providing an extended reality playback 500 that may be used to guide equipment personnel in and around the infrastructure equipment 104. In this example, the extended reality playback 500 may be used to provide guided procedures for setting up and operating the infrastructure equipment 104. The playback 500 may provide an interactive step-by-step guide of a series or sequence of operation or tasks that needs to be completed for the infrastructure equipment 104. The guided procedure may then be validated manually by the equipment personnel, for example, through real-time data validation and/or by geo-fencing to ensure operations were done accurately and safely. Thus, for example, the playback 500 may include a video of the infrastructure equipment 104 and a computer-generated rotate arrow 502 superimposed thereon near a door handle 504 of the equipment. The rotate arrow 502 may be animated to show the direction in which equipment personnel should turn the door handle 504 to gain internal access to some aspect or component of the infrastructure equipment 104.

Figure 6:
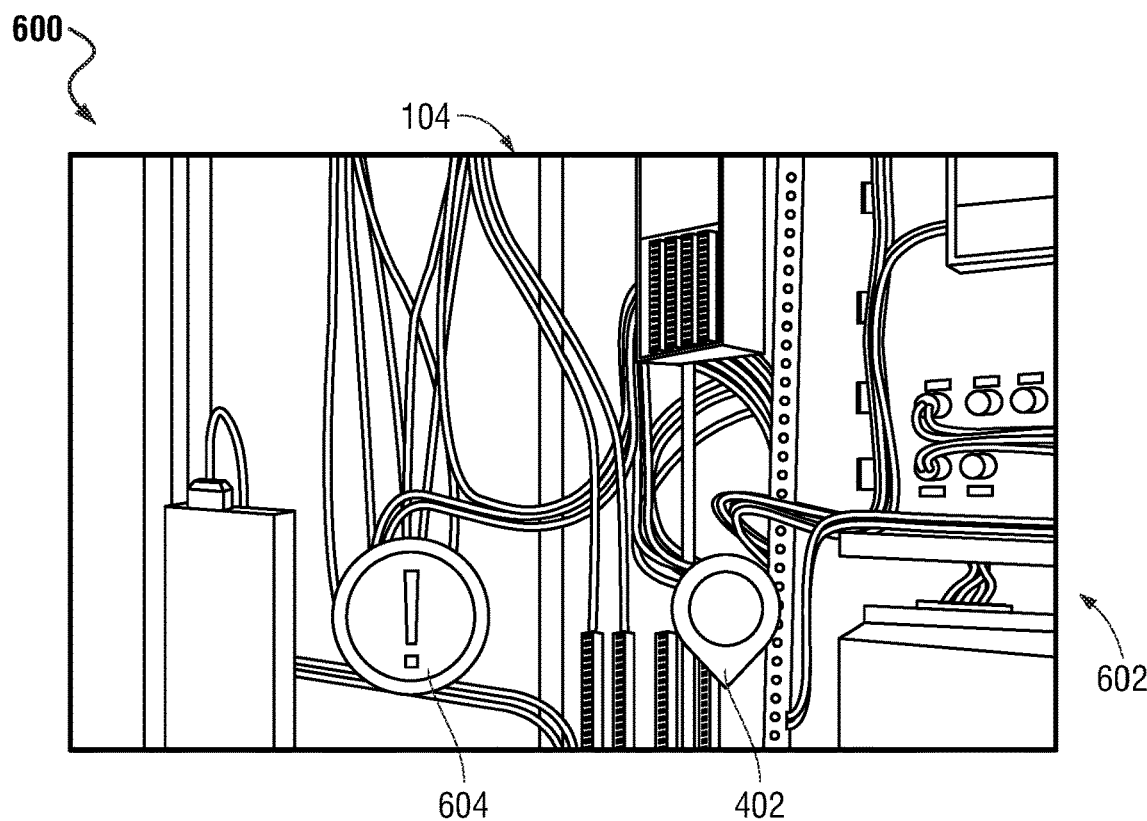
FIG. 6 illustrates an exemplary extended reality x-ray vision playback using the infrastructure monitoring and control system according to embodiments of the present disclosure.

FIG. 6 shows an example of the infrastructure monitoring and control system providing an extended reality playback 600 that offers an internal view to the infrastructure equipment 104. This feature is sometimes referred to as "X-ray vision" because equipment personnel can effectively look through the outer housing of the infrastructure equipment 104 into an interior compartment 602 of the equipment. The equipment personnel can thus see inside live equipment without shutting down the equipment or being exposed to dangerous conditions, such as high-voltage electrical power. One or more manipulation sites 402 may be superimposed over the interior compartment 602 to indicate points that may be manipulated by the equipment personnel. As well, one or more alert or alarm flags or symbols 604 may be superimposed over the interior compartment 602 to indicate the location of an error or malfunction, as detected by the infrastructure monitoring and control system via the built-in-self-test feature. The X-ray vision may be static insofar as the playback 600 shows static internal components, or the X-ray vision may be dynamic insofar as the playback 600 shows movement or changes in the equipment based on real-time data.

Figure 7:
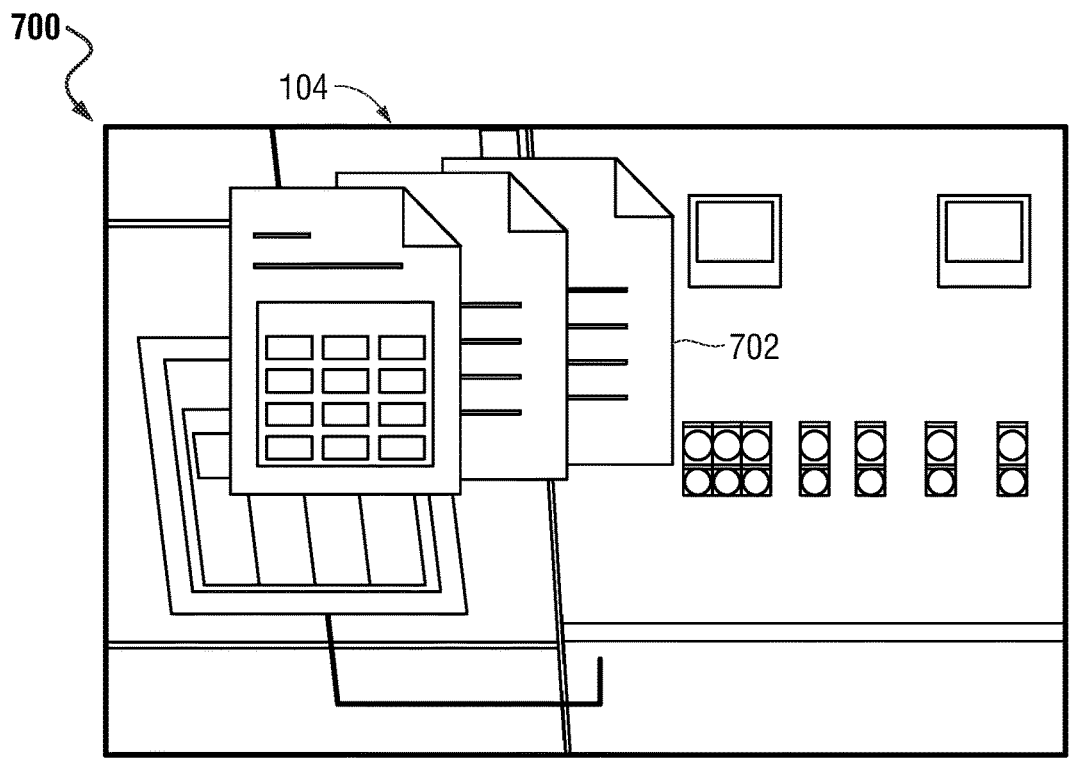
FIG. 7 illustrates an exemplary extended reality documentation playback using the infrastructure monitoring and control system according to embodiments of the present disclosure.

FIG. 7 shows an example of the infrastructure monitoring and control system providing an extended reality playback 700 that offers equipment personnel hands-free access to drawings, instructions, and documentations about the infrastructure equipment 104. For example, when an appropriate manipulation site is manipulated, the extended reality playback 700 may overlay a video or image of the infrastructure equipment 104 with a specification manual 702 for the infrastructure equipment 104. The equipment personnel may then page through the specification manual 702 to look up information about the equipment via the extended reality playback 700.

Figure 8:
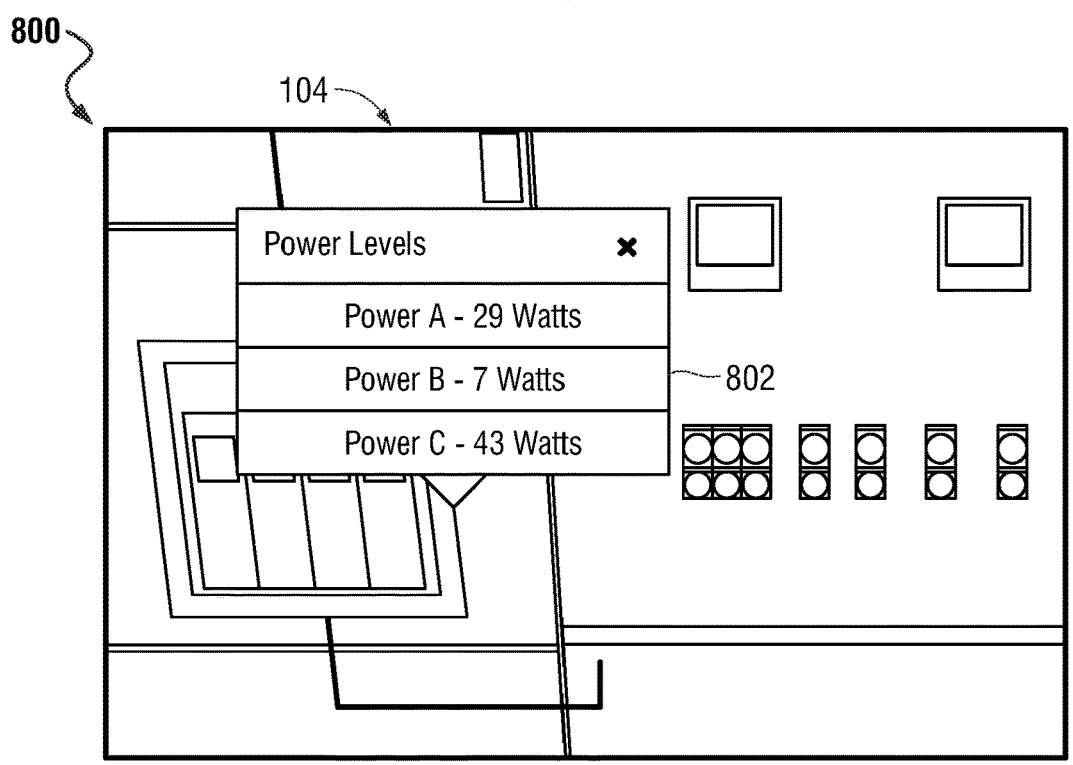
FIG. 8 illustrates an exemplary extended reality real-time status playback using the infrastructure monitoring and control system according to embodiments of the present disclosure.

FIG. 8 shows an example of the infrastructure monitoring and control system providing an extended reality playback 800 that lets equipment personnel view real-time operational and status information for the infrastructure equipment 104. For instance, when an appropriate manipulation site is selected, the extended reality playback 800 may overlay a video or image of the infrastructure equipment 104 overlaid with real-time power level readings 802 for the infrastructure equipment 104 based on real-time measurements taken by power meters in the equipment. This allows the equipment personnel to confirm that the infrastructure equipment 104 is operating as expected.

Figure 9:
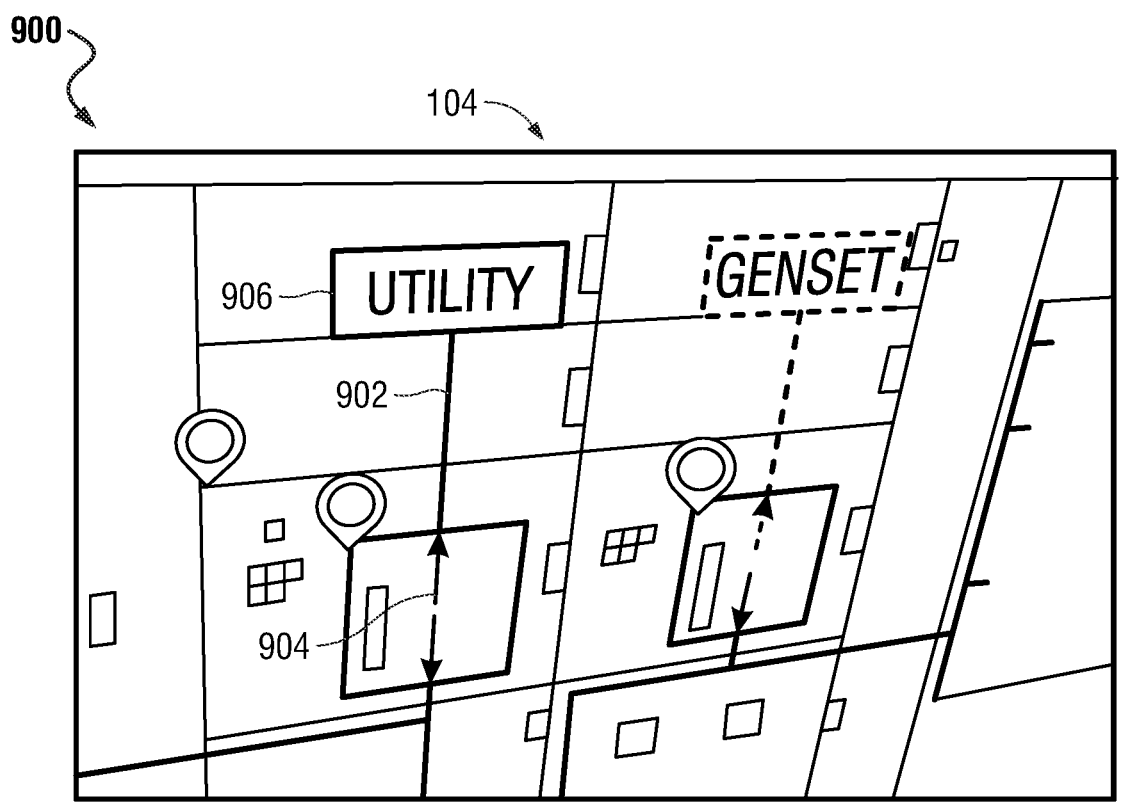
FIG. 9 illustrates an exemplary extended reality equipment animation playback using the infrastructure monitoring and control system according to embodiments of the present disclosure.

FIG. 9 shows an example of the infrastructure monitoring and control system providing an extended reality real-time video 900 that allows equipment personnel to view real-time animated electrical connections over the infrastructure equipment 104. In this example, the extended reality real-time video 900 may present the equipment personnel with a video or image of the infrastructure equipment 104 with an electrical representation of the equipment superimposed on the equipment. The electrical representation may be composed of a symbolic content, such as lines and arrows (e.g., conductor 902), symbols (e.g., circuit breaker 904), text (e.g., utility label 906), and the like. The infrastructure monitoring and control system may use different colors in the extended reality real-time video 900 to indicate the statuses of the various components in the infrastructure equipment 104, such as the color red (solid line) for an open circuit breaker and green (dashed line) for a closed circuit breaker, and so forth. This allows the equipment personnel to quickly see the statuses of different components in the infrastructure equipment 104. The extended reality real-time video 900 may then be stored in a media repository (e.g., real-time sequences of events library 206) for subsequent recall and playback as needed.

Figure 10:
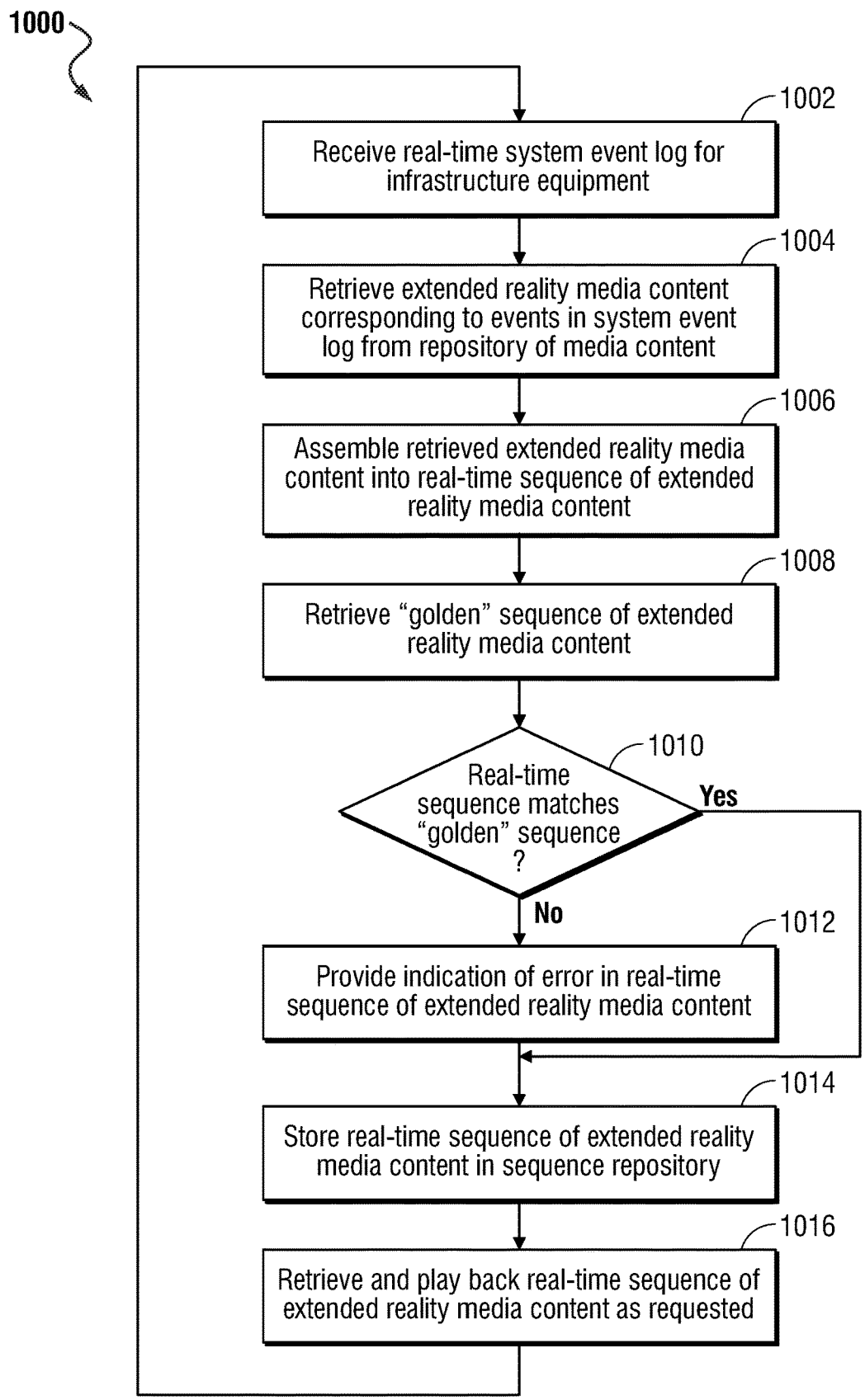
FIG. 10 illustrates an exemplary method for extended reality monitoring and control according to embodiments of the present disclosure.

Turning now to FIG. 10, a flowchart 1000 is shown for a method that may be used with or by the infrastructure monitoring and control system according to embodiments of the present disclosure. The method generally begins at 1002 when the infrastructure monitoring and control system receives a real-time system event log for infrastructure equipment being monitored by the system. As mentioned above, such system event logs are typically generated in real time by controllers within the infrastructure equipment and can be aggregated in some cases to provide a system-wide event log. At 1004, the infrastructure monitoring and control system retrieves extended reality media content corresponding to the events in the system event log. The extended reality media content may be retrieved, for example, from a repository or library of such media content, indexed appropriately for ease of access.

At 1006, the infrastructure monitoring and control system assembles the retrieved extended reality media content into a real-time sequence of extended reality media content that visually depicts or simulates the events captured in the system event log. The infrastructure monitoring and control system thereafter retrieves a known good or verified "golden" sequence of extended reality media content corresponding to the real-time sequence. At 1010, the infrastructure monitoring and control system determines whether the real-time sequence of extended reality media content matches the corresponding "golden" sequence of extended reality media content. If there is no match, then the infrastructure monitoring and control system provides an indication of an error malfunction in the real-time sequence of extended reality media content at 1012. Such an indication may be a superimposed alert flag, for example, or replacement of certain media content with identical media content having a different color (i.e., red instead of green).

If the determination at 1010 is a match, then the infrastructure monitoring and control system stores the real-time sequence of extended reality media content in a repository or library of such real-time sequences at 1014. The real-time sequence may also be played at this time if equipment personnel is currently using the infrastructure monitoring and control system to perform real-time monitoring and control of the infrastructure equipment. At 1016, the real-time sequences of extended reality media content may be retrieved by the infrastructure monitoring and control system for playback on a user device as requested.

Thus, as set forth above, the infrastructure monitoring and control system (and method therefor) described herein can provide numerous advantages and benefits. Among other things, the system can provide dynamic electrical mimic bus in which equipment personnel can view real-time animated electrical connections and status overlaid on top of equipment in the extended reality playback. The system can provide alarm and status monitoring in which equipment personnel can view equipment real-time data in the extended reality playback environment. The system can provide forms and automated task reports in which manufacturing, installation, operation, inspection and maintenance forms can be filled out in the extended reality playback environment and, upon completion, the system can generate an automated report. The system can provide hands-free equipment control in which equipment personnel can control and manage live equipment from a safe distance while still observing operation thereof and making changes in real time. The system can facilitate safety zone awareness whereby equipment personnel can utilize extended reality geofencing technology to ensure safety zones and PPE (Personal Protective Equipment) requirements are observed. The system can provide hands-free audio notes whereby equipment personnel can record notes in the extended reality playback. The system can provide extended reality messaging in which equipment personnel can send messaging across any smart device, including, smart watches, phones, tablets, hybrid devices, laptops and PCs in the extended reality playback. The system can also offer remote extended reality assistance in which equipment personnel can connect to an offsite technical expert via video (e.g., FaceTime) in an augmented or virtual environment, and the expert can view and analyze the real time extended reality environment as if they were on site. And the actual assistance can be recorded for later playback and review to support training and quality assurance and to ensure compliance to safety standards.

The extended reality playback enables the recording of all real-time infrastructure applications as mentioned above. The real-time applications may be recorded and made available for later retrieval and viewing by users throughout the equipment's journey from manufacturing or field retrofit through the ends of its useful life. With extended reality playback, the physical world is coupled with the virtual world. This is accomplished by utilizing playback to replay the series of events that have happened in the past, on a virtual image of the equipment.

The above-described aspects of the technology may be advantageous for improving operational performance of equipment by providing more interactive training and guided procedure improves facility operator effectiveness, reduce electrical downtime required servicing electrical power equipment with better insight, improve safety and reduce the risk of injury or death by minimizing exposure to live equipment, and improve infrastructure management, real-time control, monitoring and management of equipment. Further advantages may include enabling the replay of events for more effective and engaging infrastructure events analysis, manufacturing/testing procedures, operations training, validation of any changes to the system, replay audio notes and the other above listed applications. This ensures that no event or operation is missed and can be leveraged in the future. Moreover, by introducing techniques continuous built-in automated validation of infrastructure equipment operation, the extended reality playback system can predict and flag issues before they become a problem.

Thus, as discussed, embodiments of the present disclosure provide system and method for extended reality playback of events associated with infrastructure equipment. In some embodiments, the extended reality playback simulates events occurring at the infrastructure equipment. The embodiments may include a library comprising a series of events associated with one or more operations of the infrastructure equipment. Each event of the series of events may be sequenced and associated with media content that is used for the extended reality playback. Thereafter, a continuous presentation of the media content is displayed at a media player based on an extended reality user interface. The presentation simulates an extended reality playback of the series of events occurring on a visual representation of the infrastructure equipment. Thus, an advantage of the present disclosure is that it blends physical equipment with virtual and digital worlds. It enables playback in all three extended reality environments, e.g. Augmented Thermal Scan. In some instances, the technology is self-validating in that the extended reality playback of real-time infrastructure or equipment operations may be compared to a known good execution of the same operations to predict issues before they become problems.

A method for event playback in infrastructure equipment is also disclosed. The method can be performed using an infrastructure-monitoring and control system that includes a first active infrastructure component, a visual code on an exterior of the infrastructure component linked to at least one infrastructure monitoring and control system or one sensor monitoring activity within the infrastructure component, or other solutions including equipment recognition, 3-D augmented reality positioning (via point cloud, LIDAR, geo-localization), and a first terminal such as a smartphone or camera to identify the component in order to access the sensor. A second terminal, such as an augmented reality playback device (e.g., mobile phone or tablet, glasses), mixed reality playback device (e.g., Microsoft HoloLens headset), virtual playback device (e.g., Windows PC or Oculus Virtual Reality headset) is operatively connected to the first terminal to receive sensor, actuator, or processing data. The augmented services can be provided via a physical device or a virtual device (e.g., virtual machine, virtual appliance, software only). The augmented services can be hosted on premise or a single or multi-tenant cloud. The method includes receiving event data associated with infrastructure equipment processes, wherein the event data comprises a series of events associated with one or more operations of the infrastructure equipment, sequencing media content to each of the series of events associated with the one or more operations of the infrastructure equipment, and displaying at a media player a continuous presentation of the media content to simulate an extended reality playback of the series of events occurring at a visual representation of the infrastructure equipment. The media player can display the media within a wearable headset. In addition to the ability to reading and illustrating data from devices, the infrastructure monitoring and control system also includes the ability to provide commands (write to the systems), capture, and record and provide a playback for the monitoring and control system. The monitoring and control system can also produce a "Digital Twin" for users employing augmented reality on their respective phones and tablets capture their operations, activities, and interactions with the extended reality infrastructure and playback their activities, to see and test how they performed in their training or other actions.

The displayed infrastructure equipment can be a simulation, such as a 3-D model, which can be used for training purposes. For instance, a simulation of an even can be cast into a user's headset and the user can walk through analyzing the problem and taking the necessary corrective action. Alternatively, the displayed infrastructure equipment can be a video representation of real infrastructure equipment and real events that have taken place with a real piece of equipment. The displayed infrastructure equipment can be set in a virtual background in order for a user to be able to visualize the equipment in a location that is more familiar to them. The equipment can also be separated and placed in a virtual background or space that allowing the user to freely move about the equipment, whereas if the equipment was laid out as in real life, obstructions such as walls and chairs might be in the way of walking from one visualization to another. The method can include manipulating the infrastructure equipment, including reversing at least one of the series of events in order to fix the events.

The continuous presentation can be displayed on a plurality of displays, wherein each of the plurality of displays are located at different locations. The method can include displaying a characteristic of the equipment, which are not otherwise visible through video or to the naked eye in a virtual layer over the equipment in order to show what is happening or happened within the equipment. The characteristics can include an internal temperature, or a presence of flammable gas within the equipment.

Sequencing can be stopped once the infrastructure has reached a steady state or no changes have taken place after a predetermined time period. The media player can display a compound image showing playback with no events and the sequenced media in order to compare normal operation to an event operation.

In general, the infrastructure monitoring and control system (and method therefor) may monitor any equipment associated with building operation. For instance, in this example, the infrastructure monitoring and control system monitors generators. The infrastructure monitoring and control system may monitor other equipment as well, including without limitation protective relays, power, cooling, utilities (water, gas, electricity, HVAC, Data Center racks) surge-protection equipment, networking equipment, HVAV equipment, fuel systems, flywheels, servers and virtual machines, CRAC units, power distribution units, paralleling gear, GPS receivers, load banks, power quality meters, breakers, sequence recorders, security equipment, fire alarms, branch circuits, station batteries, UPS (uninterruptable power supply), gensets, DC equipment, and/or other equipment. In this illustrated arrangement, the infrastructure monitoring and control system is located on site of the monitored equipment. However, alternatively, the infrastructure monitoring and control system may be located remotely such as at a remotely located control center. The infrastructure monitoring and control system may be configured to carry out various functions of the disclosed method The method can be used to provide a visual representation of stored system events occurring in a system monitored by an infrastructure monitoring and control system both in substantially real-time during the system events and after a given amount of time since the occurrence of the system events. The method includes receiving event data associated with infrastructure equipment processes, wherein the event data comprises a series of events associated with one or more operations of the infrastructure equipment, sequencing media content to each of the series of events associated with the one or more operations of the infrastructure equipment, and displaying at a media player a continuous presentation of the media content to simulate an extended reality playback of the series of events occurring at a visual representation of the infrastructure equipment.

It should be understood that for this and other processes and methods disclosed herein, the flowchart shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and random access memory (RAM). The computer readable medium may also include non-transitory media, such as secondary or persistent long term storage, like read only memory (ROM), optical or magnetic disks, or compact-disc read only memory (CD-ROM), for example. The computer readable media may also be any other volatile or non-volatile storage systems, or other articles of manufacture. The computer readable medium may be considered a computer readable storage medium, for example, or a tangible storage device.

In addition, for the method and other processes and methods disclosed herein, each block may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

The infrastructure monitoring and control system may provide, in substantially real-time, a visual representation of at least one system event occurring in the infrastructure equipment. In an example embodiment, the visual representation comprises a color-coded visual representation depicting the at least one system event throughout the infrastructure equipment.

For example, in one situation, the infrastructure monitoring and control system would allow a user to visualize a fault via color where a protective relay signals that there is an undesired bus differential within the system. Such a differential may turn the affected area of the system from one particular color (e.g., green) to a particular warning color (e.g., red). This would allow the user of the system to take notice of this undesired bus differential and then visual how the system is impacted by such a fault. In another example, the system may be used detect not just fault conditions but also other operating conditions. As just one example, the system may be used to detect a poor power quality within the system. The system may react to such a situation by designating the impacted area of the system turn a different color (e.g., yellow) based on how good or how bad the power quality is on that particular line. This would allow the user to estimate how risky is the power path is for certain equipment on that line and therefore would also allow the user to estimate any negative impact on the equipment over a certain period of time.

The at least one system event may generally be any system event or any component event that may be useful for a user monitoring the infrastructure equipment to be aware of. These system events may span, for example, from normal operation of system equipment to equipment failure. In an example, the at least one system event may be a power-quality problem occurring in the infrastructure equipment. Generally, a power-quality problem may be a power problem manifested in voltage, current, or frequency deviations that may result in reduction in expected life, disoperation, and/or failure of system equipment.

The visual representation of the at least one system event may visually depict the at least one system event occurring in the system. In an example, a system event or events may propagate through the infrastructure equipment. For instance, a first system event may lead to a second system event, which may in turn lead to a third system event, and so forth. For example, a fire in a building may lead to an equipment failure or an alarm, which may in turn lead to further equipment failures and/or alarms. Beneficially, these visual representations may demonstrate propagation of the at least one system event through the infrastructure equipment. These visual representations may be valuable both in real-time and for future analysis. A user of the infrastructure monitoring and control system may view these events in real-time, and having access to these visual representations may help the user respond to system events in order to control or fix the system events. For instance, a user of the infrastructure monitoring and control system viewing the visual representation may determine that given equipment is in a critical state or setting off system alarms, and based on the visual representation the user may determine which steps to take are most appropriate for the given system event. Knowing and graphically seeing in real-time which equipment is affected by the at least one system event may be extremely useful for a user to take appropriate corrective action whether by equipment upgrade, replacement, maintenance, or otherwise.

In an example, the infrastructure monitoring and control system provides the visual representation on a display, such as a monitor or monitors, of the infrastructure monitoring and control system. Therefore, a user of the infrastructure monitoring and control system may watch these events in substantially real-time on display.

In an example embodiment, infrastructure monitoring and control system can provide descriptive indicator for certain system events. As just one example of such indicators, the infrastructure monitoring and control system can rate system events on a scale having a plurality of levels (e.g., criticality levels). For instance, in an example embodiment, the infrastructure monitoring and control system may rate events on a scale of 1-3, where "level 1" corresponds to normal operation, "level 2" corresponds to abnormal operation, and "level 3" corresponds to emergency operation or equipment failure. Additional or fewer levels on the scale are possible as well (e.g., the infrastructure monitoring and control system may rate events on a scale of 1-10, wherein the events range from normal operation to failure).

Further, in this example embodiment, the infrastructure monitoring and control system may associate each event level with a color oriented descriptive indicator. In order to provide a visual representation of the system events occurring throughout infrastructure equipment, the infrastructure monitoring and control system may determine, for each of the at least one system event, a level of the system event. Further, providing the visual representation of these system events may then involve, for each of the system events, depicting the system event with a given color associated with the determined level of the system event. Having a plurality of color-coded event levels may beneficially visually assist a user of the infrastructure monitoring and control equipment determine the criticality of events occurring throughout the infrastructure equipment.

Continuing the example above, "level 1" events corresponding to normal operation may be associated with the color green; "level 2" events associated with abnormal operation may be associated with the color yellow; and "level 3" events associated with emergency operation may be associated with the color red. Therefore, in a given visual representation, equipment operating normally may appear green, equipment operating abnormally may appear yellow, and equipment operating in emergency mode or failed equipment may appear red. Other descriptive indicators/colors and color associations are possible as well.

As mentioned above, the infrastructure monitoring and control system may display these visual representations in substantially real-time. While there may be slight delay due to the infrastructure monitoring and control system taking appropriate equipment measurements, the infrastructure monitoring and control system preferably provides these visual representations as soon as possible after identifying the system events. In this way, the user of the infrastructure monitoring and control system may be viewing the events essentially as the events are occurring in the infrastructure equipment. Responding to system events may be a highly time-critical matter. Thus, seeing the events unfold in substantially real-time may be important for a user of the infrastructure monitoring and control system.

The infrastructure monitoring and control system may store the visual representation of the at least one system event. The infrastructure monitoring and control system may store the visual representation. In an example, the infrastructure monitoring and control system may be configured to store all the visual representations provided by the infrastructure monitoring and control system. In this way, a user may be able to review the visual representations at any point during which the infrastructure monitoring and control system was in operation. In an example, the infrastructure monitoring and control system stores all visual representations of the infrastructure monitoring and control system, including visual representations provided during normal operation levels of the system equipment.

In other examples, the infrastructure monitoring and control system may be configured to store visual representations in response to detecting a triggering event that prompts the infrastructure monitoring and control system to store the visual representation. Beneficially, only storing the visual representation upon detecting a triggering event may conserve valuable storage space for the infrastructure monitoring and control system.

The triggering event may be any appropriate triggering event. In an example, the triggering event may be a system event of a given level. In the example where the infrastructure monitoring and control system rates events on a scale of 1-3, the infrastructure monitoring and control system may be configured to begin storing a recording when a system event reaches a "level 2" event. Further, in an example, the stored visual representation may cover the time period from the beginning of the "level 2" event until the system returns to "level 1" (i.e., normal operation).

In an example embodiment, the triggering event may be user-defined. That is, the triggering event may be an event that is associated with user-defined triggering level. For instance, a user of a first infrastructure monitoring and control system may wish to trigger this storage upon the occurrence of an event of a first level (e.g., a "level 2" event), while another user or a second infrastructure monitoring and control system may wish to trigger this storage only upon the occurrence of an event of a second level (e.g., a "level 3" event).

The infrastructure monitoring and control system may then, provide the visual representation after a given amount of time since the at least one system event. Generally, the infrastructure monitoring and control system is configured to provide the visual representation after the infrastructure monitoring and control system has already provided the visual representation in substantially real-time. In a particular example, the given amount of time since the at least one system event is at least one hour after the at least one system event. However, the given amount of time may be any amount of time after the system event or events has occurred. For instance, this given amount of time may be minutes after the event, hours after the event, days after the event, or months after the event. It should be understood that more or less time after the event is possible as well.

A user of the infrastructure monitoring and control system may wish to view the visual representation after the event has occurred in order to analyze the at least one system event. For instance, it may be useful to analyze how the system event or events propagated through the infrastructure equipment. As another example, it may be useful to analyze the response or measures that were taken in order to contain or fix the system event(s), and to analyze whether those measures were successful or unsuccessful. Other reasons for view the visual representation after the system event(s) are possible as well.

For example, the dynamic visual playback system may include color-coded visual representations of events for various equipment, such as generators, transfer switches, protective relays, surge protection, networking equipment, HVAC, building management, flywheels, static transfer switches, servers/virtual machines, CRAC units, power distribution units, paralleling gear, breakers, GPS receivers, power quality meters, sequence recorders, load banks, fire pump controllers, security, fire alarms, branch circuits, station batteries, UPS, DC equipment. Other monitored equipment is possible as well.

In an example embodiment, the infrastructure monitoring and control system may store the visual representation by storing data that the infrastructure monitoring and control system may then use to recreate or reproduce the visual representation. For example, the infrastructure monitoring and control system may store a data file having data representative of the visual representation, and the infrastructure monitoring and control system may also be configured to use the data file to recreate the visual representation at a later time.

In other example embodiments, the visual representation is not a color-coded visual representation. Rather, the visual representation may be coded in another way in order to visually depict system events occurring in the infrastructure equipment. Any suitable visual representation is possible. For instance, the visual representation may include graphical symbols that illustrate the system events and event levels. For instance, rather than colors such as green, yellow, and red, symbols such as a "+", "−", and "X" could be used to illustrate various levels of system events. Other symbols are possible as well. Further, other codes for visually depicting system events occurring in the infrastructure equipment are possible as well.

As described above, the proposed methods and systems beneficially provide an improved way for analyzing infrastructure system events remotely and by multiple users given amount of time after the event has occurred. In particular, the proposed methods and systems provide dynamic visual playback for an infrastructure monitoring and control system using a mixed reality space. Such dynamic visual playback may allow users to analyze a visual representation of system events after the events have occurred, and to simulate other events which is an improvement over merely allowing a user to analyze text-based files of standard infrastructure monitoring system event logs. For these reasons and the reasons described throughout this disclosure, the disclosed methods and systems can help improve infrastructure monitoring and control systems and event analysis associated with those systems.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. An extended reality infrastructure monitoring and control system, comprising:
    a media storage processor operable to store extended reality media content for infrastructure equipment; and
    a media playback processor coupled to the media storage processor, the media playback processor operable to:
    receive real-time event data associated with the infrastructure equipment recorded in a real-time event log of the infrastructure equipment, wherein the real time event data comprises a series of events associated with one or more operations of the infrastructure equipment, the events including one or more of a circuit breaker transitioning from OPEN to CLOSE and CLOSE to OPEN, a switch transitioning from MAIN to BACKUP and BACKUP to MAIN, and a control relay transitioning from ON to OFF and OFF to ON;
    identify, from an equipment database, an equipment type of the infrastructure equipment and/or facility where the infrastructure equipment is installed;
    access extended reality media content stored by the media storage processor corresponding to the series of events, wherein a media content type of the media content may vary based on the equipment type of the infrastructure equipment;
    assemble the extended reality media content into a real-time sequence of extended reality media content corresponding to the series of events associated with the one or more operations of the infrastructure equipment; and
    present the real-time sequence at a user device as a continuous presentation of extended reality media content that provides an extended reality playback of the series of events occurring at a visual representation of the infrastructure equipment.

2. The system of claim 1, wherein the media playback processor is further operable to perform error detection for the real-time sequence of extended reality media content and provide an error indication in the real-time sequence of extended reality media content upon detection of an error.

3. The system of claim 2, wherein the media playback processor is operable to perform error detection by comparing the real-time sequence of extended reality media content to a corresponding verified sequence of extended reality media content.

4. The system of claim 1, wherein the media playback processor is further operable to present the real-time sequence at a user device in real time and at any time thereafter as selected by a user.

5. The system of claim 1, wherein the media playback processor is further operable to present in real time or play back an extended reality service at the user device, the extended reality service including: a guided procedure, X-ray vision, hands-free documentation, real-time equipment statuses, and animated equipment connections.

6. The system of claim 1, wherein the infrastructure equipment includes electrical power infrastructure equipment.

7. The system of claim 1, wherein the system is hosted locally relative to the infrastructure equipment, remotely on a private or public cloud, or a combination of locally and remotely.

8. A method for event playback in infrastructure equipment, comprising:
- receiving event data associated with the infrastructure equipment recorded in a real-time event log of the infrastructure equipment, wherein the event data comprises a series of events associated with one or more operations of the infrastructure equipment, the events including one or more of a circuit breaker transitioning from OPEN to CLOSE and CLOSE to OPEN, a switch transitioning from MAIN to BACKUP and BACKUP to MAIN, and a control relay transitioning from ON to OFF and OFF to ON;
- identifying, from an equipment database, an equipment type for the infrastructure equipment and/or a facility where the infrastructure equipment is installed;
- assembling media content corresponding to each of the series of events associated with the one or more operations of the infrastructure equipment, wherein a media content type of the media content may vary based on the equipment type of the infrastructure equipment; and
- displaying a continuous presentation of the media content at a user device, the continuous presentation providing an extended reality playback of the series of events occurring at a visual representation of the infrastructure equipment.

9. The method of claim 8, further comprising detecting perform error detection for infrastructure equipment by comparing the extended reality playback of the series of events to a corresponding verified series of events.

10. The method of claim 9, further comprising providing an error indication in the extended reality playback of the series of events upon detection of an error.

11. The method of claim 8, wherein the user device includes one of a wearable headset or glasses.

12. The method of claim 8, wherein the visual representation of the infrastructure equipment includes a real-time video of the infrastructure equipment.

13. The method of claim 8, wherein the media content includes computer-generated representations of events occurring at the infrastructure equipment.

14. The method of claim 8, further comprising manipulating the infrastructure equipment in the extended reality playback in accordance with a user selection.

15. The method of claim 8, wherein manipulating the infrastructure equipment includes reversing at least one event in the series of events.

16. The method of claim 8, further comprising displaying a characteristic of the infrastructure equipment in a virtual layer over the equipment in the extended reality playback.

17. The method of claim 16, wherein the characteristics include an internal temperature, a voltage, or a presence of flammable gas within the infrastructure equipment.

18. The method of claim 8, wherein further assembling is stopped once the infrastructure equipment has reached a steady state or no changes have taken place in the infrastructure equipment after a predetermined time period.

19. The method of claim 1, wherein access to the media player is granted by a user terminal scan of a visual code, a scan of the equipment, or a location selection.

20. A non-transitory computer-readable medium having computer-readable instructions stored thereon that, when executed by one or more processors, cause the one or more processors to perform a method according to claim 8.

\* \* \* \* \*